(12) United States Patent
Stamper et al.

(10) Patent No.: US 7,721,332 B2
(45) Date of Patent: May 18, 2010

(54) INTEGRATED SOFTWARE FOR MANAGING ADD-ONS

(75) Inventors: Douglas Edward Stamper, Sammamish, WA (US); Tariq Sharif, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1279 days.

(21) Appl. No.: 11/205,407

(22) Filed: Aug. 16, 2005

(65) Prior Publication Data

US 2007/0044085 A1 Feb. 22, 2007

(51) Int. Cl.
G06F 17/30 (2006.01)
G06F 11/00 (2006.01)
(52) U.S. Cl. .............................. 726/22; 726/25; 726/26
(58) Field of Classification Search .................. 726/22, 726/25, 26
See application file for complete search history.

(56) References Cited

OTHER PUBLICATIONS

Evans (Dynamic On-line Object Update in the Grumps System, year 2002).*
BHOdemon (CFS Program Review: BHODemon. Published on Jul. 1, 2004).*
Business Wire (RiverSoft Launches Advanced IP Network Management Software Setting New Industry Standard, Business Wire, Jun. 26, 2001).*
Taint-Graph-Based for Automatic Spyware Analysis; Zhi-Peng Lu; Yu-Jie Hao; Zhi-Jian Ding; Rui Zhang; Qiao-Ling Han; Apperceiving Computing and Intelligence Analysis, 2008. ICACIA 2008. International Conference on Dec. 13-15, 2008 pp. 334-337.*
Intel case study: Software on demand; Rueda, G.; Spence, C.; Management of Engineering & Technology, 2008. PICMET 2008. Portland International Conference on Jul. 27-31, 2008 pp. 829-845.*
EC: an edge-based architecture against DDoS attacks and malware spread; Karrer, R.P.; Advanced Information Networking and Applicaitons, 2006. AINA 2006. 20th International Conference on vol. 2, Apr. 18-20, 2006 pp. 49-56.*

* cited by examiner

*Primary Examiner*—David Y Jung (57) ABSTRACT

Retrieval software and add-on collection software are integrated to provide a computer user information on add-ons attempting to instantiate, or alternatively, install, on the user's computer system. The retrieval software, i.e., software for locating and retrieving information from networked information services, uses information from data the collection software, i.e., software capable of collecting information about add-ons that exist via the World Wide Web, can retrieve on an add-on to create a record of status information on the add-on. The retrieval software displays this record of status information to the computer user. The retrieval software can also use information collected on an add-on to generate a recommendation identification for the add-on. The recommendation identification is an indication of what the retrieval software suggests the computer user should do with the add-on, e.g., allow its instantiation or deny its instantiation, or, alternatively, allow or block its installation.

20 Claims, 10 Drawing Sheets

INTEGRATED SOFTWARE FOR MANAGING ADD-ONS

BACKGROUND

In a general computer scenario, a user may install software on a computer via a software program for locating and retrieving information from networked services, such as, but not limited to, a browser. A browser is a software utility program that allows a user to locate and retrieve information such as programs from the World Wide Web ("www"), i.e., the Internet. MICROSOFT INTERNET EXPLORER® and NETSCAPE NAVIGATOR® are examples of World Wide Web browsers.

Currently when software is installed on a computer, additional add-ons, i.e., additional software programs, utilities, applications, etc., may also try to concurrently install and begin running, i.e., instantiate. An add-on may be a virus, meant to do the user's computer harm. Alternatively, the add-on may be in the form of spyware, whose intent is to monitor the user's use of the computer for the spyware creator's own purposes. Or, an add-on may be adware, which produces a form of advertising on the user's computer, in for example, a pop-up menu. The add-ons may also be more beneficial software, such as program toolbars or program extensions, which if installed and instantiated, could increase the user's enjoyment of and productivity with the computer.

In any of these cases however, the computer user generally has no information or understanding as to what any particular add-on is or does. With no information of understanding of any particular add-on, the computer user is unequipped to make an informed decision about what to do with any particular add-on, such as, for example, allow or block the add-on from installing, or allow or deny the add-on's instantiation.

SUMMARY

This summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

Embodiments discussed herein include technology to provide a computer user relevant information about add-ons, in which the technology involves collecting and integrating information via, for example, the World Wide Web about existing add-ons with computer software for locating and retrieving information from networked information services. In certain embodiments, recommendation information as to what the user should do with any particular add-on is generated and provided to the user. The user can utilize this provided recommendation information to make informed decisions about which add-ons to allow and which to reject.

In an aspect of an embodiment, software for locating and retrieving information from networked information services (i.e., "retrieval software") is integrated with software for collecting information about existing add-ons (i.e., "collection software") to provide a computer user information about add-ons to the computer. The user can utilize the provided information to make decisions about which add-ons to allow and which to reject.

In an aspect of another embodiment, a computer readable medium contains instructions for collecting and integrating information, from, for example, the World Wide Web, about existing add-ons in order to provide a computer user information about add-ons to the computer. The user can utilize the provided information to make decisions about which add-ons to allow and which to reject.

BRIEF DESCRIPTION OF THE DRAWINGS

These and other features will now be described with reference to the drawings of certain embodiments, which are intended to illustrate and not to limit the invention, and in which:

FIG. 8 illustrates a logic flow for providing a computer user status on an add-on.

DETAILED DESCRIPTION

In the following description, for purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid unnecessarily obscuring the invention.

Briefly, in one embodiment, a computer user is provided information via a computer's retrieval software (i.e., software for locating and retrieving information from networked information services) when a previously installed add-on first attempts instantiation, i.e., attempts to run or be used. In another embodiment, the user is provided information via the retrieval software on an add-on attempting to install on the computer. In an aspect of either embodiment, the user is provided recommendation information regarding the add-on's instantiation, or, alternatively, its installation, which the user can use to determine what action to take, e.g., allow or block, with regard to the add-on.

Figure 1:
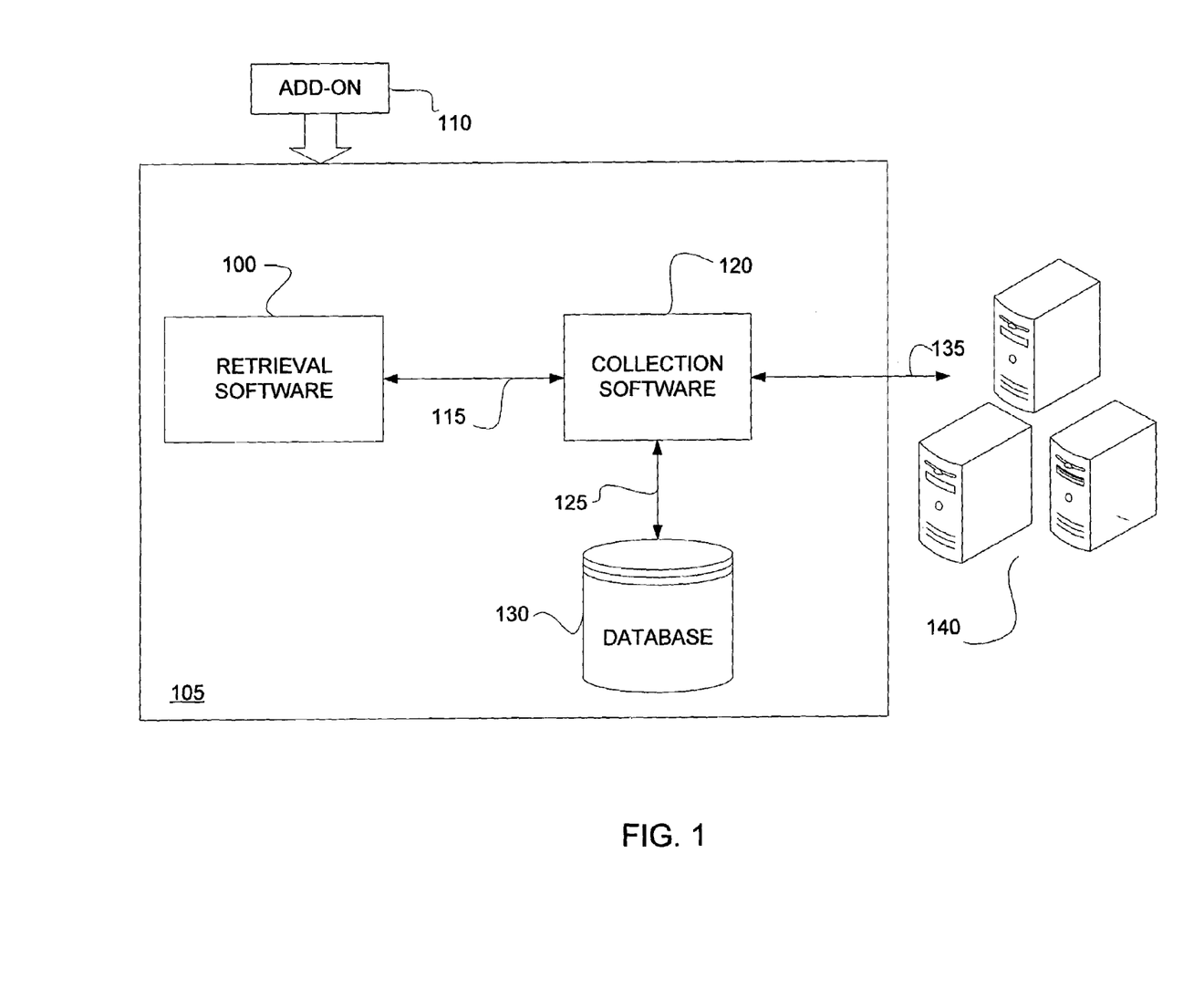
FIG. 1 is a block diagram of an embodiment of a system that integrates software for locating and retrieving information from networked information services with software capable of identifying information about add-ons.

FIG. 1 is an exemplary system that includes retrieval software 100 operating on a user's computer 105. Also running on the user's computer is software for collecting information on add-ons 120 ("collection software"). When an add-on 110 attempts to instantiate on the user's computer 105, the retrieval software 100 communicates 115 with the collection software 120 to obtain information about the add-on 110. The collection software 120 communicates 115 information on the add-on 110 to the retrieval software 100. If the collection software 120 does not have, and cannot retrieve, any data on the add-on 110, it communicates 115 this lack of add-on data to the retrieval software 100.

In an embodiment, the collection software 120 accesses 125 a local database 130 containing data on known add-ons. The collection software 120 may also, or alternatively, communicate 135 with various computer servers 140, including on-line servers accessible to the collection software 120 via the World Wide Web, to retrieve data pertaining to the add-on 110.

In one embodiment, the collection software-120 accesses 125 a local database 130 and/or communicates 135 with one or more computer servers 140 for available data on an add-on 110, and the information the collection software 120 communicates 115 to the retrieval software 100 is the available data it retrieved on the add-on 110, or, alternatively, an indication that there was no available data on the add-on 110. In another embodiment, the information the collection software 120 communicates 115 to the retrieval software 100 on an add-on 110 is derived by the collection software 120 from the available data it retrieves on the add-on 110, and includes, if such information can be derived from the existing add-on data, the publisher of the add-on and an identification of the add-on category, such as, but not limited to, Spyware, Adware, Virus, Toolbar or program Extension.

In one embodiment, after the retrieval software 100 receives the information on the add-on 110 from the collection software 120, the retrieval software 100 uses this information to determine a rating for the add-on 110. In an embodiment, the rating is a recommendation indication of what the user should do with the add-on attempting to instantiate on the computer, e.g., allow or block the instantiation.

In certain embodiments, the retrieval software 100 assigns the add-on 110 one of three possible ratings: Safe To Instantiate; Hazardous To Instantiate; or Unknown Status. Safe To Instantiate indicates that the retrieval software 100 determined that the add-on 110 will be of benefit (e.g., program toolbar or program extension) to the computer user's use and enjoyment of the computer. Hazardous To Instantiate indicates that the retrieval software 100 determined that the add-on 110 poses a nuisance (e.g., adware), or a likely hazard (e.g., spyware or virus) to the user's computer. Unknown Status indicates that the collection software 120 was unable to retrieve any, or enough, data on the add-on 110 for the retrieval software 100 to rate the add-on 110.

In other embodiments, the retrieval software 100 assigns the add-on 110 a scaled rating, with the lowest scale point indicating the add-on 110 is Safe To Instantiate, and the highest scale point indicating the add-on 110 is Hazardous To Instantiate. Exemplary software code for providing such a scaled rating is as follows:

```
typedef enum tagSPYWARE_RATING
{
    SPYWARE_RATING_LOW           0x1,
    SPYWARE_RATING_MEDIUM_LOW    0x2,
    SPYWARE_RATING_MEDIUM        0x3,
    SPYWARE_RATING_MEDIUM_HIGH   0x4,
    SPYWARE_RATING_HIGH          0x5
} SPYWARE_RATING;
```

Other forms, manners and scales of rating the add-on 110 may be used in alternative embodiments.

Figure 2:
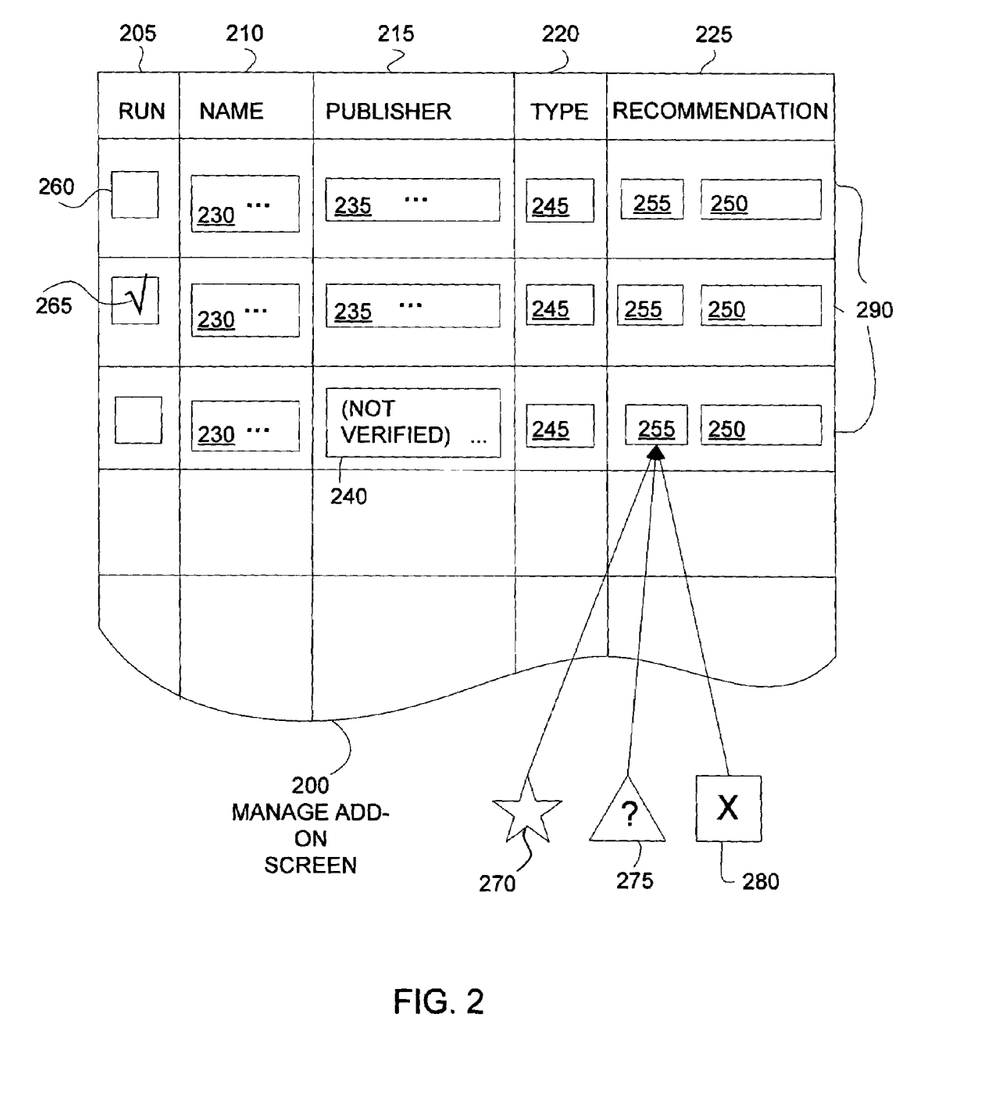
FIG. 2 is an embodiment of a Manage Add-On screen for a computer.

The retrieval software 100 further uses the information received on the add-on 110 to provide a display screen, e.g., a pop-up screen, to the computer user. An exemplary Manage Add-On screen 200 is depicted in FIG. 2.

Each record 290 in the Manage Add-On screen 200 contains status information on an add-on 110. Each record 290 has a name entry 210 populated with the name 230, if known, of the respective add-on 110. Each record 290 also contains a publisher entry 215 populated with the name of the add-on's publisher 235, if known. In certain embodiments, the Manage Add-On screen 200 indicates if the publisher name 235 was not verified 240 for the respective add-on 110. The Manage Add-On screen 200 also contains a type entry 220 for each record 290 indicating the add-on type 245, e.g., Browser Helper Object, if the add-on type 245 is identifiable.

The Manage Add-On screen 200 also contains a recommendation entry 225 for each record 290. The recommendation entry 225 provides the user a recommendation identification 255 that indicates how the user should react to the respective add-on's 110 attempt to instantiate. In certain embodiments, the recommendation entry 225 also provides the user an identification of the add-on category 250, e.g., but not limited to, Spyware, Adware, Virus, program Toolbar or program Extension.

The recommendation identification 255 for an add-on 110 provides the user data for use in determining whether or not the add-on's instantiation should be allowed. For example, in an embodiment, the recommendation identification 255 is pictorial. In one embodiment, a Star 270 indicates the add-on 110 is safe ("Safe To Instantiate"); a Triangle encompassing a question mark 275 indicates the status of the add-on 110 is unknown ("Unknown Status"); and, a Square enclosing an "X" 280 indicates the add-on 110 is deemed hazardous ("Hazardous To Instantiate").

In an alternative embodiment, the recommendation identification 255 is a scale point number, e.g., 1 to 5. In another alternative embodiment, the recommendation identification 255 is a bar graph depicting where in a scale point range an add-on 110 has been deemed to lie. Other forms and manners of depicting a recommendation identification can be used in alternative embodiments.

Referring again to FIG. 2, in an embodiment the Manage Add-On screen 200 provides a mechanism, via a run entry 205 for each record 290, for the user to select whether or not to allow the instantiation of an add-on 110. In one embodiment, the mechanism is a Run check box 260. If the user checks 265 (e.g., clicks the computer mouse in) a Run check box 260, the user wishes to allow the instantiation of the identified add-on 110, and the retrieval software 100 then allows the add-on 110 to instantiate. If the user does not click a Run check box 260 for an add-on 110, the retrieval software 100 blocks the instantiation of the add-on 110 from that time forward.

In some cases, two or more add-ons 110 may attempt to instantiate on a user's computer concurrently. In response, the retrieval software 100 communicates 115 with the collection software 120 to obtain information on each such add-on 110. The collection software 120 retrieves data for each requested add-on 110, if available, and communicates 115 information on each add-on 110 to the retrieval software 100. In an embodiment, the collection software 120 communicates 115 the information on any particular add-on 110 to the retrieval software 100-as it identifies the information. In another embodiment, the collection software 120 identifies and collates all the information on each requested add-on 110 first, and then communicates 115 the collated information for all requested add-ons 110 to the retrieval software 100.

Figure 3:
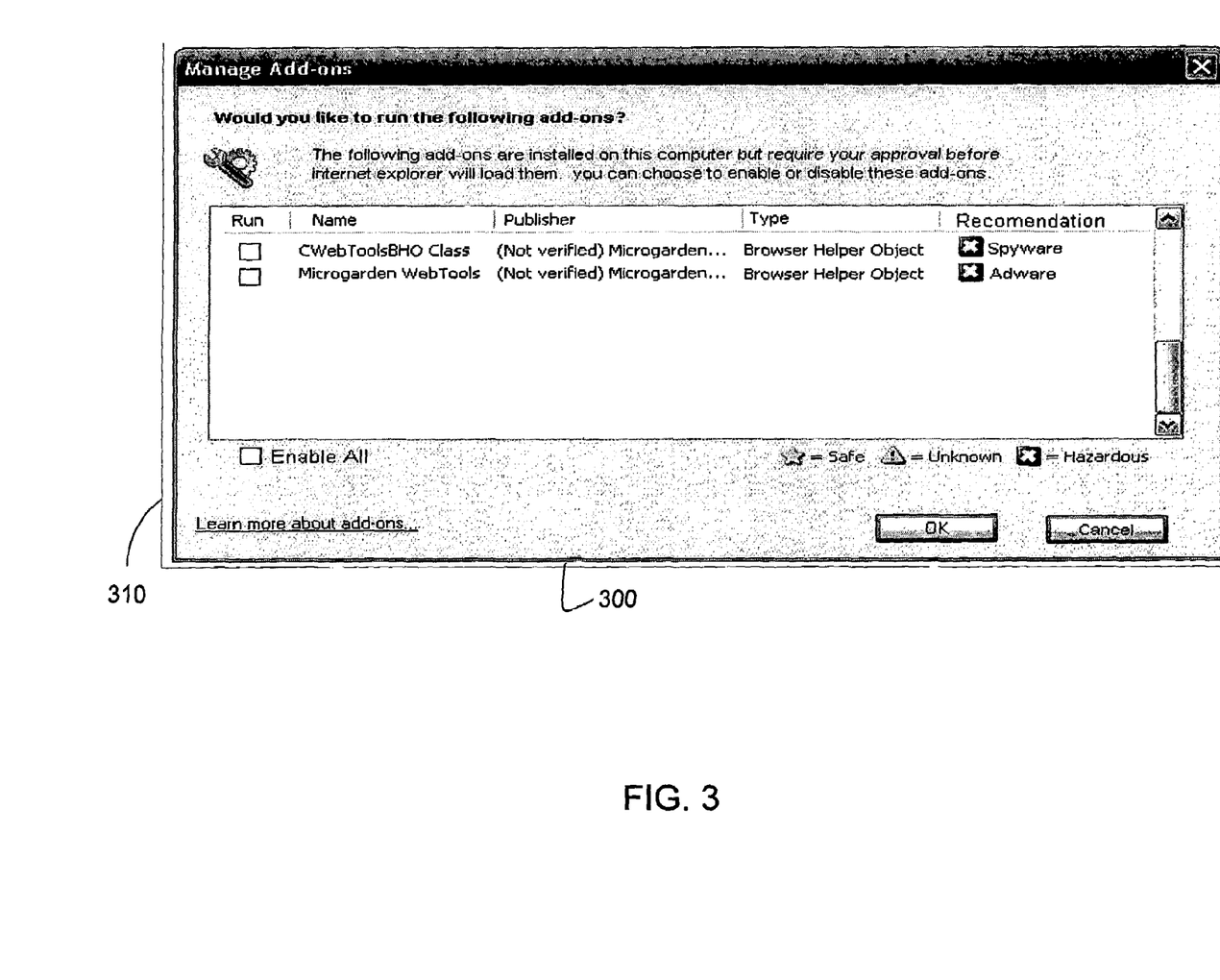
FIG. 3 is an exemplary Manage Add-On screen.

FIG. 3 depicts an exemplary populated Manage Add-On screen 300. In an embodiment, the user can click on an Enable All check box 310, causing the retrieval software 100 to allow the instantiation of all the add-ons 110 identified in the Manage Add-On screen 300.

In certain embodiments, once a user is presented with a Manage Add-On screen 200 for any particular add-on 110, and chooses to either allow or deny the add-on's instantiation, the user is no longer queried in any Mange Add-On screen 200 for an instantiation determination on that add-on 110.

Figure 4A:
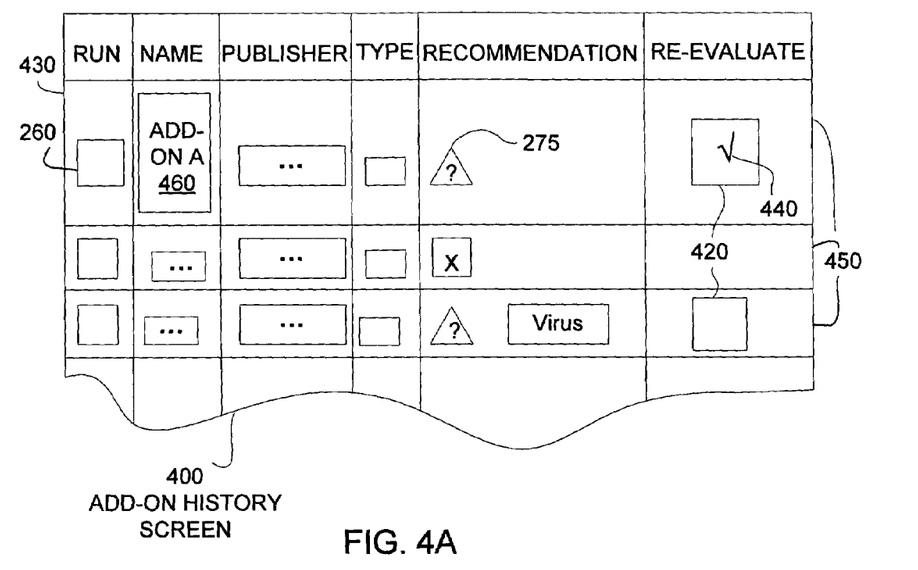
FIG. 4A is an embodiment of an Add-On History screen for a computer.

Referring to FIG. 4A, in one embodiment a second, Add-On History, screen 400 can be activated by the user at any time from the retrieval software 100. The Add-On History screen 400 provides the user status information on all the add-ons 110 that have, during a specified time-period, or, alternatively, ever, attempted to instantiate on the computer 105, and allows the user to reconsider whether or not to allow the instantiation of any particular add-on 110.

For example, at Time 1, the user may have been first queried in a Manage Add-On screen 200 about an adware add-on for digital photography. At Time 1, the user was interested in the topic, and determined the adware would be useful. The user therefore checked 265, e.g., clicked on, the Run check box 260 in the appropriate Manage Add-On screen record 290 of FIG. 2 for this adware, and has been receiving periodic digital photography adware pop-ups on the computer 105 since. However, at Time 2 the user no longer wants the digital photography adware pop-ups. Referring again to FIG. 4A, the user can access the Add-On History screen 400 to tell the retrieval software 100 to block the digital photography adware by-checking the appropriate Run check box 260 in the Add-On History screen 400. As the adware's Run check box 260 was previously checked 265 in the Manage Add-On screen 200, the user's click on the Run check box 260 in the Add-On History screen 400 for the digital photography add-on now clears, or unchecks, it. The retrieval software 100 thereafter blocks the identified digital photography adware from running on the user's computer 105.

The Add-On History screen 400 can also be used to allow the instantiation of an add-on 110 the user previously blocked. The user, in the Add-On History screen 400, clicks on the appropriate Run check box 260 for an add-on 110 that is currently blocked from instantiating on the user's computer 105. As the add-on's Run check box 260 was previously unchecked, in the Manage Add-On screen 200, the user's click on the Run check box 260 in the Add-On History screen 400 now checks it. The retrieval software 100 thereafter allows the instantiation of the identified add-on 110.

In certain cases, the collection software 120 may not be able to retrieve enough, or even any, data on a particular add-on 110 attempting to instantiate on the user's computer at the time the retrieval software 100 sends a first request on the add-on 110 to the collection software 120. Referring back to FIG. 2, in this example of an embodiment, the Manage Add-On screen 200 identifies this lack of known information on the add-on by an Unknown Status rating, e.g. a Triangle encompassing a question mark symbol 275. Receiving no information on whether or not the add-on 110 is harmful at this time, the user may likely choose to block its instantiation.

Figure 4B:
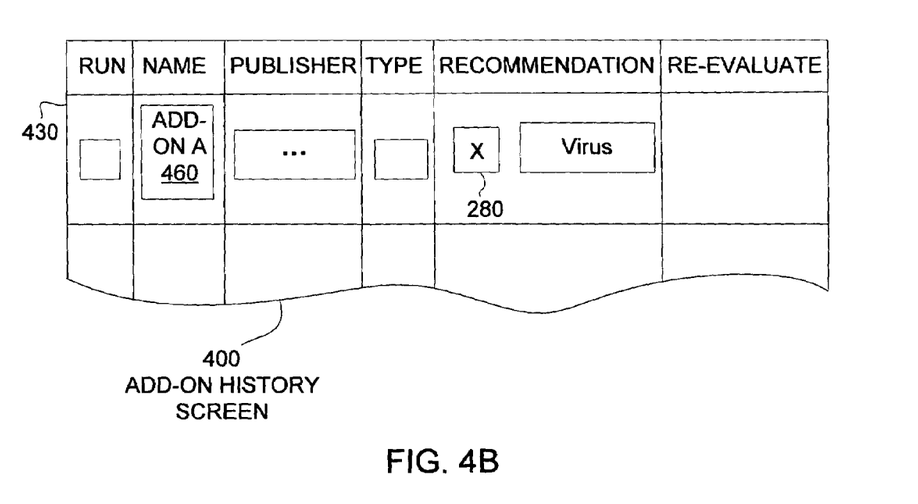
FIG. 4B is the Add-On History screen of FIG. 4A in which a record has been updated.

In an embodiment, the user can access the Add-On History screen 400 of FIGS. 4A and 4B to determine if information has become available on an add-on 110 with a previously designated Unknown Status, and if so, potentially change a prior determination for the instantiation of the add-on 110.

In this embodiment, the Add-On History screen 400 provides the user a Re-Evaluate check box 420 for every add-on 110 that currently has a designated Unknown Status. If the user checks 440 the Re-Evaluate check box 420 for a particular add-on 110, the retrieval software 100 then communicates 115 with the collection software 120 for current information on the add-on 110. If the collection software 120 now has and/or can retrieve data on the add-on 110, it communicates 115 relevant information on the add-on 110 to the retrieval software 100. The retrieval software 100 then updates the Add-On History screen 400 to display the newly identified status information for the add-on 110, including any new recommendation identification for the instantiation of the add-on 110. Using this new status information, the user can then check the Run check box 260 for the add-on 110 in the Add-On History screen 400 and cause the retrieval software 100 to allow the add-on 110 to instantiate.

FIG. 4B is an exemplary depiction of an Add-On History screen 400 with an updated record 430 for an add-on 110 that in FIG. 4A has an Unknown Status designation. Referring to FIG. 4A, the Add-On History screen record 430 for a particular add-on 110, e.g., ADD-ON A 460, indicates that at Time 1, ADD-ON A 460 has an Unknown Status designation 275. At Time 2, the user checks 440 the Re-Evaluate check box 420 for record 430, and the retrieval software 100 then communicates 115 with the collection software 120 to obtain any new information that the collection software 120 can provide it on ADD-ON A 460. In this example, at Time 2, the collection software 120 retrieves data on ADD-ON A 460 that includes an identification of ADD-ON A 460 as a virus. The collection software 120 communicates 115 such new information on ADD-ON A 460 to the retrieval software 100. The retrieval software 100, as shown in FIG. 4B, thereafter updates the Add-On History screen 400 to identify that ADD-ON A 460 is a Virus, and has been given a Hazardous To Instantiate designation 280.

In another embodiment, the Add-On History screen 400 provides a Re-Evaluate check box 420 for every add-on 110 ever identified in a Manage Add-On screen 200 on a user's computer 105. This embodiment allows for new information becoming available for an add-on 110 that results in a change to one or more fields, or entries, of the add-on's record 450 in the Add-On History screen 400. The user can determine to re-evaluate any, or any combination, of installed add-ons 110 by checking 440 the appropriate Re-Evaluate check boxes 420. The retrieval software 100 then sends one or more communications 115 to the collection software 120 to obtain any new available information on each add-on 110 the user requested to re-evaluate. The collection software 120 attempts to retrieve current data on each requested add-on 110, and communicates 115 information for each requested add-on 110 to the retrieval software 100. The retrieval software 100 thereafter updates the Add-On History screen 400 to display any newly identified status information for each requested add-on 110, including as appropriate, a new recommendation identification for one or more of the add-ons 110. Based on any such new status information, the user can then check or uncheck the Run check box 260 for any add-on 110. In response, the retrieval software 100 will allow or block, as the situation warrants, the instantiation of the add-on 110.

Referring again to FIG. 1, in yet another embodiment, when an add-on 110 attempts to install on a user's computer 105, the retrieval software 100 communicates 115 with the collection software 120 to obtain information on the add-on 110. The retrieval software 100 uses any information received from the collection software 120 on the add-on 110 to determine a rating for the add-on 110. In an embodiment, the rating is a recommendation indication of what the user should do with the add-on attempting to install on the computer, e.g., allow or block the installation.

Figure 5A:
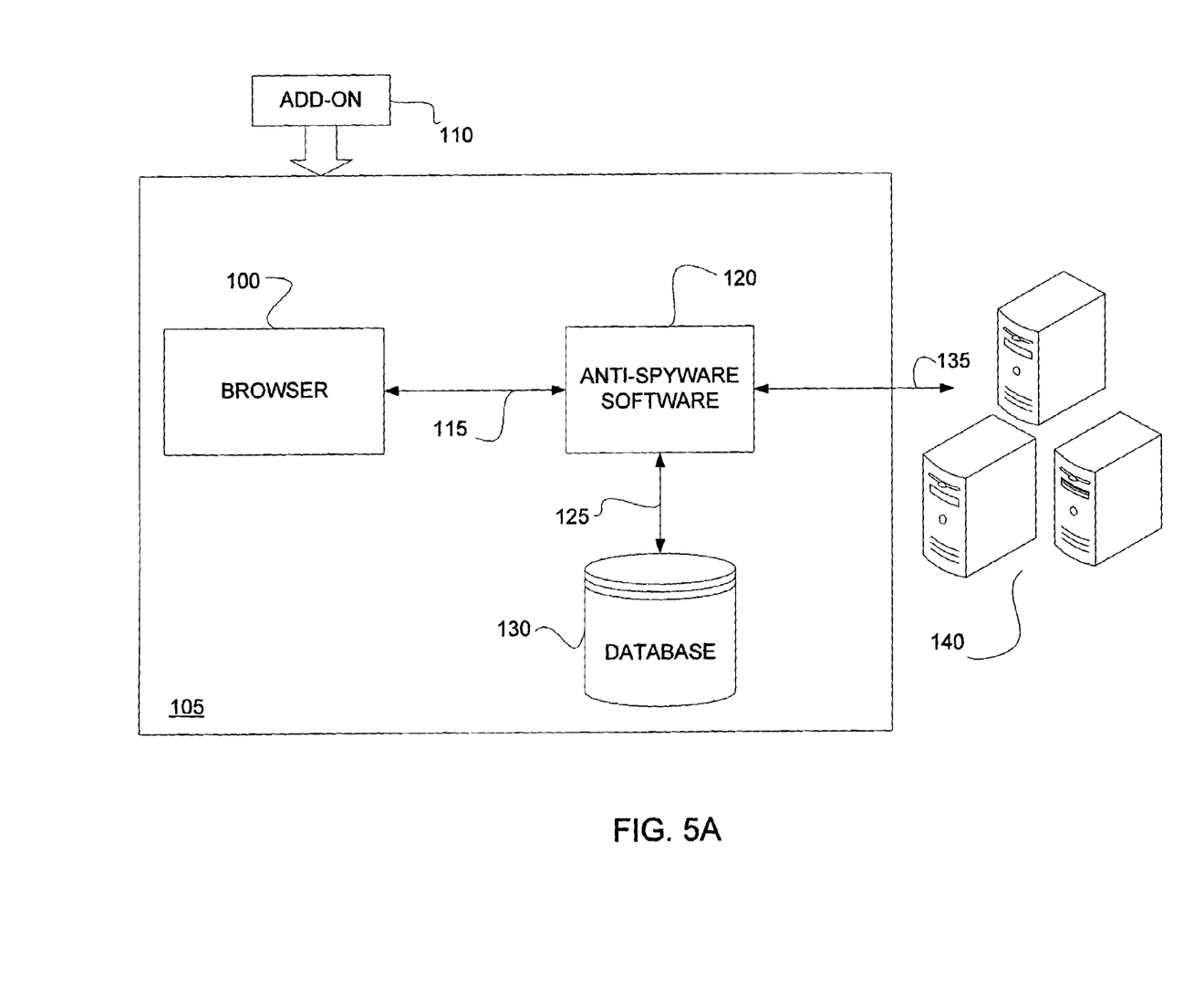
FIG. 5A is a block diagram of an embodiment of a system that integrates a computer browser with anti-spyware software.

Referring to FIG. 5A, in an embodiment the retrieval software 100 is a computer browser software program ("browser") operating on a user's computer 105. The collection software 120 is spyware scanner tool software. The spyware scanner tool software 120 is any known commercial anti-spyware software, e.g., MICROSOFT ® Windows Anti-Spyware, MCAFEE® AntiSpyware or SPYBOT® —Search and Destroy, or any software capable of identifying information about add-ons coming from the World Wide Web, and is hereinafter referred to generically as anti-spyware software 120.

When an add-on 110 attempts to instantiate on the user's computer 105, the browser 100 communicates 115 with the anti-spyware software 120 to obtain information about the add-on 110. The anti-spyware software 120 communicates 115 information on the add-on 110 to the browser 100. If the anti-spyware software 120 does not have, and cannot retrieve, any data on the add-on 110, it communicates 115 this lack of add-on data to the browser 100.

In an embodiment, anti-spyware software 120 accesses 125 a local database 130 containing data on known add-ons. The anti-spyware software 120 may also, or alternatively, communicate 135 with various computer servers 140, including on-line servers accessible to the anti-spyware software 120 via the World Wide Web, to retrieve data pertaining to the add-on 110.

In an embodiment, the anti-spyware software 120 includes a communication (COM) software component that the anti-spyware software 120 registers under a pre-defined software category ID. When the browser 100 communicates 115 with the anti-spyware software 120 for information on an add-on 110, the anti-spyware software 120 provides the requested information to the browser 100 via its COM software component. In an aspect of this embodiment, the browser 100 provides the anti-spyware software 120 identification data about the add-on 110 the browser 100 is interested in, such as the add-on's name and its URL (Uniform, or Universal, Resource Locator, which is the address used to specify the location of the add-on 110 on the World Wide Web). An exemplary software structure that the browser 100 uses to provide the anti-spyware software 120 identification data on the add-on 110 is as follows:

```
typedef struct _msspyinfo
{
    int cbsize;          // size of MSSPYINFO structure
    struct
    {
        ULONG fInstalled:1;      // the file at pwzFullPath is an
                                 installed file
        ULONG fHttpDownload:1;   // the file at pwzFullPath is a
                                 temp file downloaded from
                                 http/ftp
    };
    HWND hwnd;           // parent window of the calling app
    WCHAR *pwzFullPath;  // full path to the file about to
                         be opened
    WCHAR *pwzHostName;  // Host apps name
    WCHAR *pwzOrigURL;   // URL of the origin of this
                         downloaded file.
} MSSPYINFO;
```

In this embodiment, the anti-spyware software 120 uses its COM software component to communicate 115 information on the add-on 110 to the browser 100.

In another embodiment, the browser 100 comprises communication protocol software. When the anti-spyware software 120 is loaded and instantiated on the user's computer 105, the anti-spyware software 120 communicates 115 with the browser 100 to establish a dialog protocol for future browser queries on add-ons.

In one embodiment, after the browser 100 receives the information on the add-on 110 from the anti-spyware software 120, the browser 100 uses this information to rate the add-on 110. In certain embodiments, the browser 100 assigns the add-on 110 one of three possible ratings, all three of which were previously discussed herein: Safe To Instantiate; Hazardous To Instantiate; or Unknown Status. In alternative embodiments, the browser 100 can employ other forms, manners and scales of rating an add-on 110.

In an embodiment, once the browser 100 receives and analyzes the add-on 110 information from the anti-spyware software 120, it provides a display screen to the computer user. An exemplary Manage Add-On screen 200 is depicted in FIG. 2, and has been previously discussed herein.

In another embodiment, when an add-on 110 attempts to install on a user's computer 105, the browser software 100 of FIG. 5A communicates 115 with the anti-spyware software 120 to obtain information on the add-on 110. The browser software 100 uses any information received from the anti-spyware software 120 on the add-on 110 to determine a rating for the add-on 110. In an embodiment, the rating is a recommendation indication of what the user should do with the add-on attempting to install on the computer, e.g., allow or block the installation.

Figure 5B:
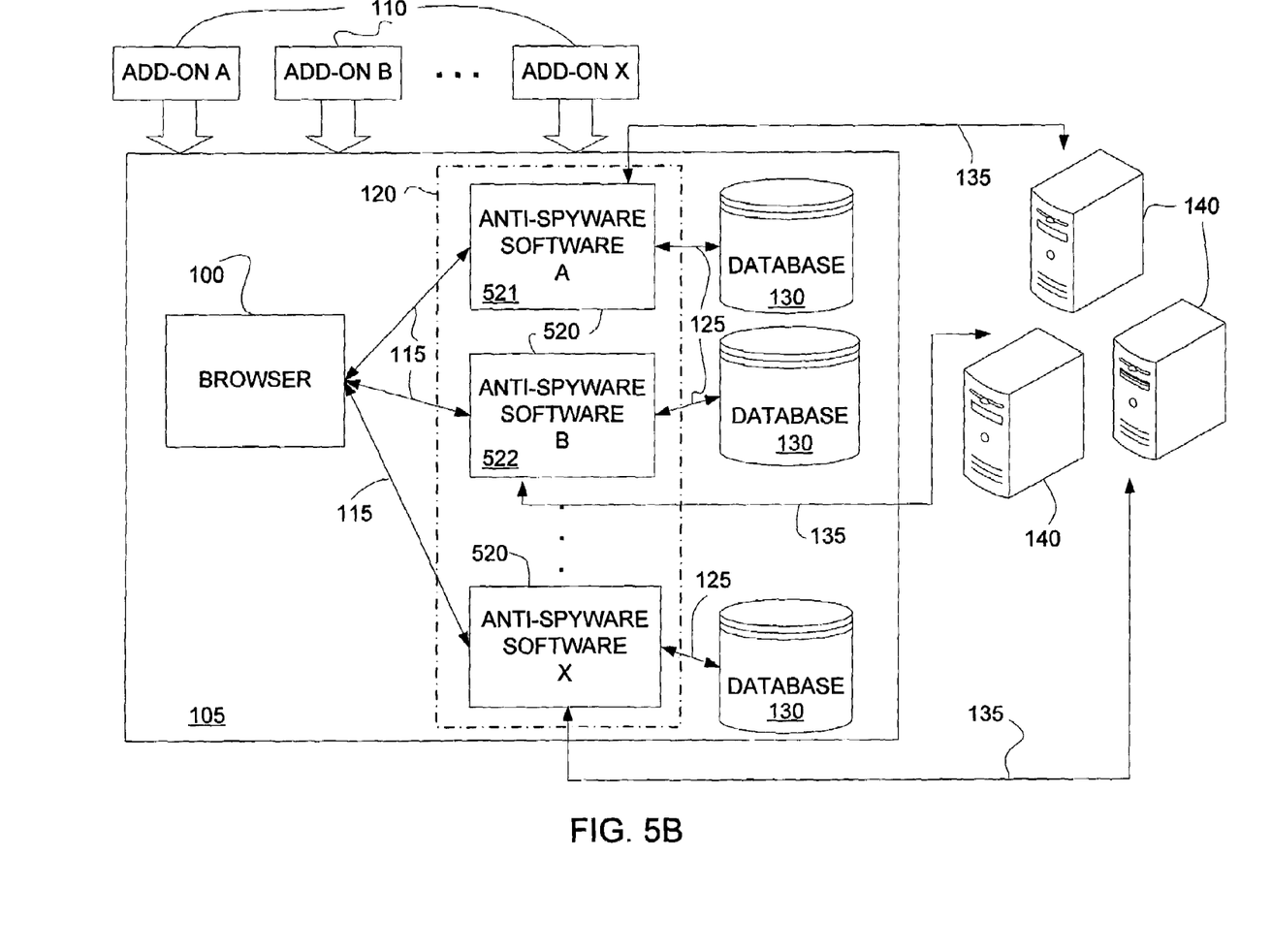
FIG. 5B is a block diagram of a second embodiment of a system that integrates a computer browser with anti-spyware software.

In another embodiment, illustrated in FIG. 5B, the retrieval software 100 is a browser and the collection software 120 is two or more anti-spyware software programs. The browser 100 operating on the user's computer 105 communicates 115 with the two or more anti-spyware software programs 120 to obtain information on each add-on 110 attempting to instantiate on the user's computer 105. The browser 100 communicates 115 a query for information on an add-on 110 to each available anti-spyware software program 520. Each anti-spyware software program 520 can access 125 a respective local database 130 for data on add-ons 110. Each anti-spyware software program 520 can also, or alternatively, communicate 135 with various computer servers 140, including on-line servers accessible to the respective anti-spyware software program 520 via the World Wide Web, to retrieve data on an add-on 110. Each anti-spyware software program 520 retrieves 125 from its respective local database 130 and/or from one or more computer servers 140 the currently available data on the requested add-on(s) 110, and communicates 115 add-on 110 information back to the browser 100. The browser 100 collects the information received from each of the anti-spyware programs 520 and formulates the table entries for each add-on 110 attempting to instantiate on the user's computer 105 in a Manage Add-On screen 200.

In one embodiment, the browser 100 chooses the most negative information received from any of the anti-spyware software programs 520 to display in the Manage Add-On screen 200. For example, assume anti-spyware software program A 521 identifies an add-on 110 as adware, and anti-spyware software program B 522 identifies the same add-on 110 as a virus. In this example, the browser 100 will identify to the user that the add-on 110 is a Virus, and provide a Hazardous To Instantiate 280 recommendation identification 255 for the add-on 110.

In another embodiment, the user is queried by the browser 100 to rank the anti-spyware software programs 520, for example, from the anti-spyware software program 520 to be given the highest priority for its information, to the anti-spyware software program 520 to be given the lowest priority. Thereafter, if the anti-spyware software programs 520 result in differing information on any particular add-on 110, the browser 100 chooses the information from the highest priority ranked anti-spyware software program 520 to use in generating a record 290 for the add-on 110 to display in the Manage Add-On screen 200. For example, assume anti-spyware software program A 521 has the highest priority, and it identifies an add-on 110 as a program extension, while anti-spyware software program B 522 identifies the same add-on 110 as a virus. In this example for this embodiment, the browser 100 will identify to the user that the add-on 110 is a program Extension, and provide a Safe To Instantiate 270 recommendation identification 255 for the add-on 110.

Figure 6:
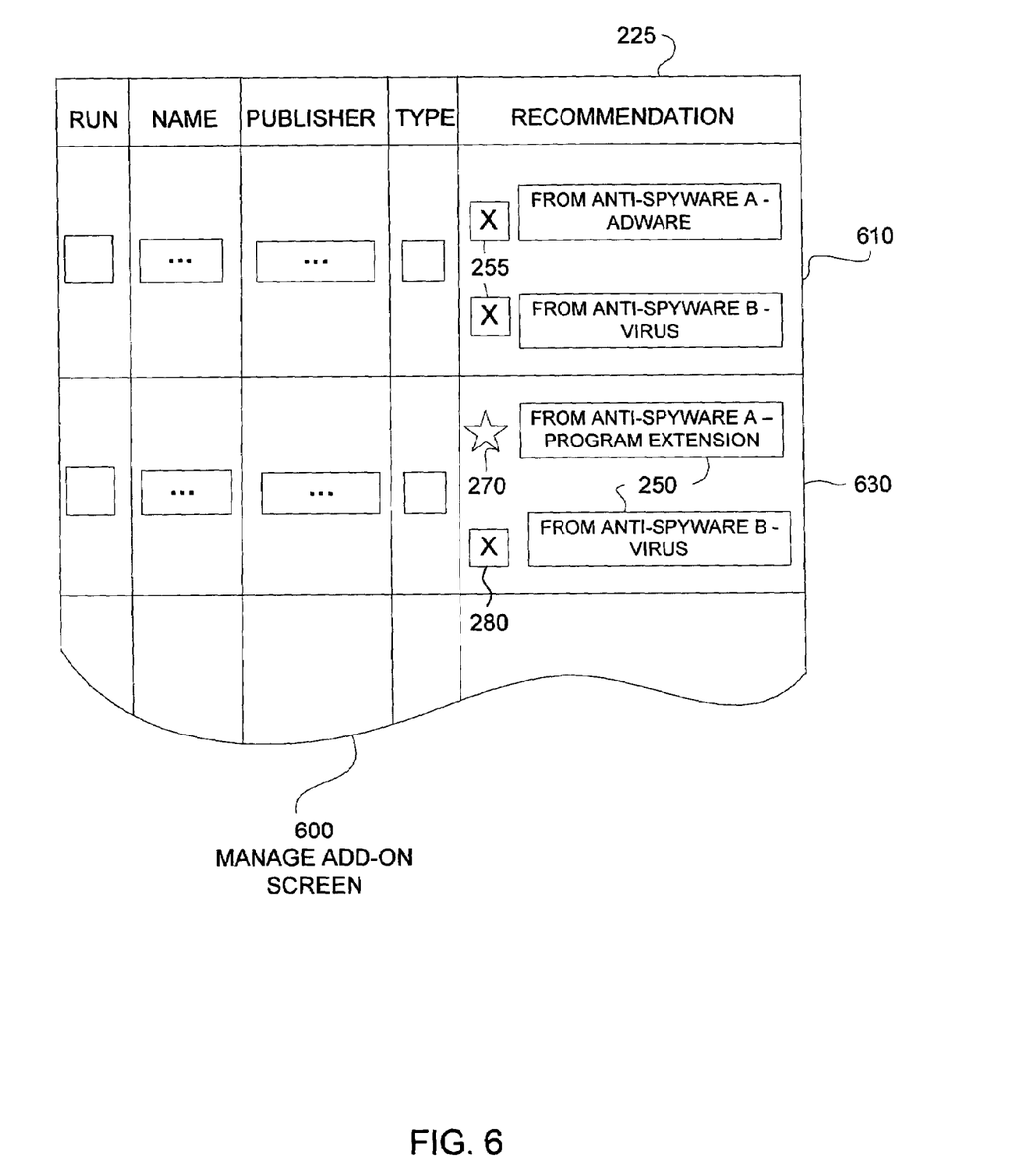
FIG. 6 is a second embodiment of a Manage Add-On screen for a computer.

In yet another embodiment, for each anti-spyware software program 520, the browser 100 depicts corresponding record information 610, including a recommendation identification 255, for each add-on 110, as depicted in the Manage Add-On screen 600 of FIG. 6. For example, assume anti-spyware software program A 521 identifies an add-on 110 as a program extension while anti-spyware software program B 522 identifies the same add-on 110 as a virus. In this example, the browser 100 displays the identification of the add-on category 250, and a corresponding recommendation identification 255, for both anti-spyware software programs 521 and 522. Referring to record 630 of the Manage Add-On screen 600, the browser 100 displays to the user in the recommendation entry 225 that anti-spyware software program A 521 has identified the add-on 110 as a program Extension and anti-spyware software program B 522 has identified the same add-on 110 as a Virus. The browser 100, pursuant to these separate identifications of the add-on category 250, displays in record 630 a Star 270 recommendation identification symbol for anti-spyware software program A 521 (indicating that, based on the information from anti-spyware software program A 521, the browser 100 designated the add-on 110 Safe To Instantiate). The browser 100 also displays in record 630 a Square enclosing an "X" 280 recommendation identification symbol for anti-spyware software program B 522 (indicting that, based on the information from anti-spyware software program B 522, the browser designated the add-on 110 Hazardous To Instantiate).

In another embodiment, the browser 100 of FIG. 5B communicates 115 with the two or more anti-spyware software programs 120 to obtain information on each add-on 110 attempting to install on the user's computer 105. The browser 100 communicates 115 a query for information on an add-on 110 to each available anti-spyware software program 520. Each anti-spyware software program 520 retrieves 125 from its respective local database 130 and/or from one or more computer servers 140 the currently available data on the requested add-on(s) 110, and communicates 115 add-on 110 information back to the browser 100. The browser 100 collects the information received from each of the anti-spyware programs 520 and, in one embodiment, formulates table entries for each add-on 110 attempting to install on the user's computer 105 in a Manage Add-On screen 200. In another embodiment, the browser 100 formulates table entries for each add-on 110 attempting to install on the user's computer 105 in a Manage Add-On screen 600. In either of these embodiments, the recommendation identifications 255 of the Manage Add-On screen 200 or the Manage Add-On screen 600 provide the user status information for use in determining whether or not to allow the add-ons' installation.

Figure 7:
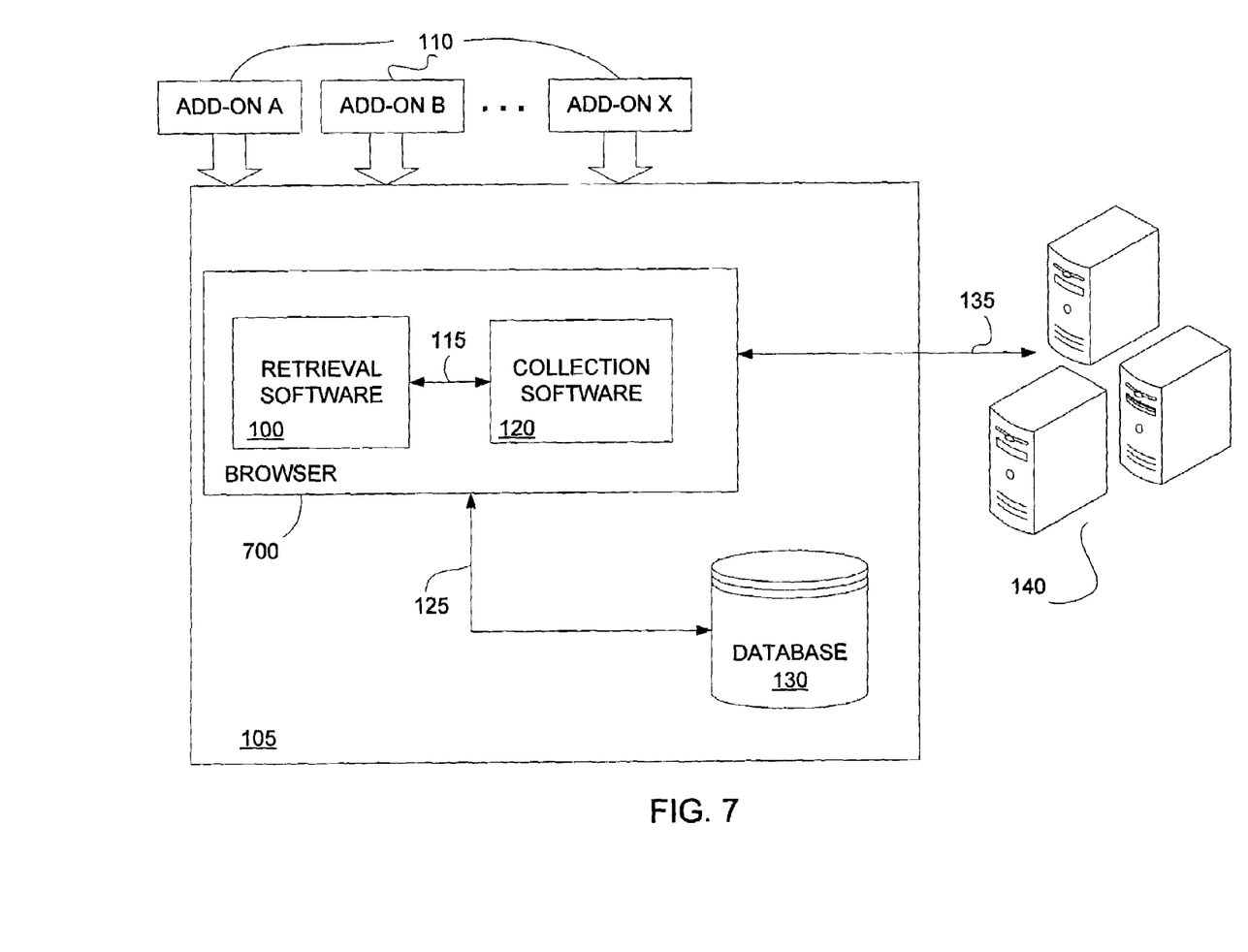
FIG. 7 is a block diagram of a system that, in a computer browser, integrates software for locating and retrieving information from networked information services with software for collecting information on add-ons.

In another embodiment, depicted in FIG. 7, the retrieval software 100 and the collection software 120 are both software of the browser 700 operating on a user's computer 105. When an add-on 110 attempts to instantiate on the user's computer 105, the browser 700 accesses 125 a local database 130 containing data on known add-ons. The browser 700 may also, or alternatively, communicate 135 with various computer servers 140, including on-line servers accessible to the browser 700 via the World Wide Web, to retrieve data on the add-on 110. The browser 700 then uses any data it retrieves on the add-on 110 to create entries for a record 290 for the add-on 110 in a Manage Add-On screen 200, including, e.g., a recommendation entry 225 for the add-on 110.

In this embodiment, the retrieval software 100 of the browser 700 communicates 115 with the collection software 120 of the browser 700 to query the collection software 120 for information on an add-on 110. The collection software 120 accesses 125 the local database 130 and/or communicates 135 with the computer servers 140 to retrieve data on the add-on 110. The collection software 120 then communicates 115 information on the add-on 110 to the retrieval software 100. The retrieval software 100 uses the information it receives from the collection software 120 to create the entries for a record 290 for the add-on 110 in a Manage Add-On screen 200.

In another embodiment, the browser 700 of FIG. 7 contains retrieval software 100 and collection software 120 for collecting and integrating information on an add-on 110 attempting to install on the computer 105. In this embodiment, the browser 700 uses any data it retrieves on an add-on 110 to create entries for a record 290 for the add-on 110 in a Manage Add-On screen 200, including, e.g., a recommendation entry 225 regarding the add-on's attempt to install on the computer 105.

Figure 8:
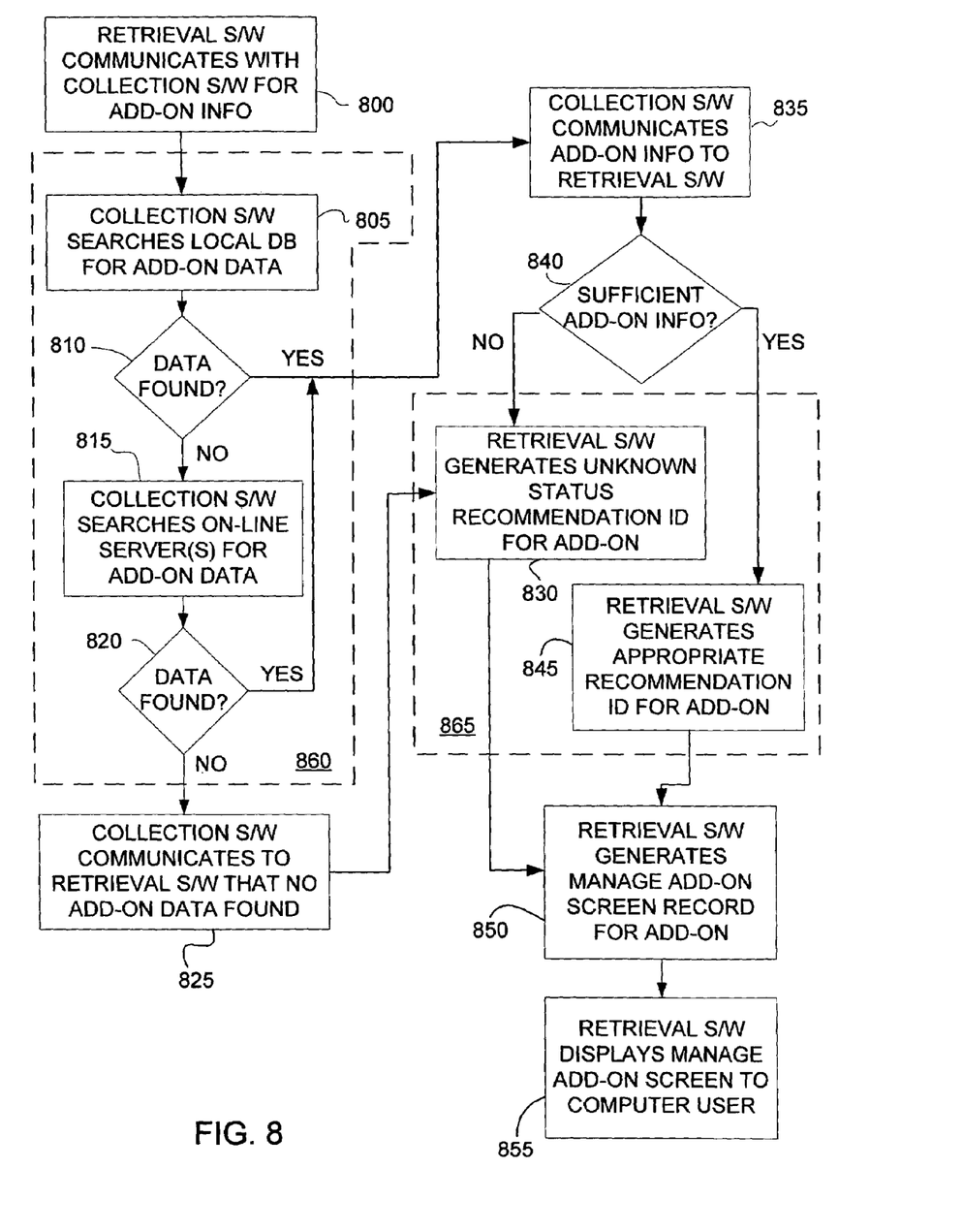

FIG. 8 illustrates a logic flow for a methodology for providing the user of a computer system status on an add-on attempting to instantiate on the computer system. While the following discussion is made with respect to systems described herein, the operations described may be implemented in other systems. Further, the operations described herein are not limited to the order shown. In some embodiments, more or fewer operations may be performed.

When an add-on first attempts to instantiate on a computer system, at block 800, retrieval software communicates with collection software to query the collection software for information on the add-on. The collection software then attempts to retrieve data on the add-on, at block 860. More specifically, at block 805 the collection software searches a local database for data on the requested add-on. The collection software then makes a determination 810 on whether its local database contains relevant data on the add-on. If yes, the collection software communicates information on the add-on to the retrieval software, at block 835. If no, at block 815 the collection software searches one or more computer servers, including on-line servers accessible to the collection software via the World Wide Web, for data on the add-on.

At decision block 820, the collection software makes a determination on whether the computer server(s) it communicated with contain relevant data on the add-on. If yes, the collection software communicates information on the add-on to the retrieval software, at block 835. If no, at block 825 the collection software communicates to the retrieval software that it has no information on the requested add-on. In response, at block 830, the retrieval software generates an Unknown Status recommendation identification for the add-on.

Assuming the collection software was able to retrieve relevant data on the add-on, in an embodiment the information it communicates to the retrieval software on the add-on is the retrieved data, or some portion of the retrieved data. In another embodiment, the information the collection software communicates to the retrieval software on an add-on is derived from the data it retrieved on the add-on.

As discussed, at block 835 the collection software communicates information on the requested add-on to the retrieval software. The retrieval software then determines 840 whether the information it receives is sufficient for the add-on. Yes or no, at block 865, the retrieval software generates a recommendation identification for the add-on. More specifically, if the retrieval software determines 840 that the information it has received on the add-on is sufficient, at block 845 the retrieval software generates an appropriate recommendation identification for the add-on, e.g., Safe to Instantiate or Hazardous To Instantiate. If, however, the retrieval software has received insufficient information on the add-on, at block 830 the retrieval software generates an Unknown Status recommendation identification for the add-on.

At block 850 the retrieval software generates a record for the add-on for a Manage Add-On screen. In an embodiment, the record contains the recommendation identification the retrieval software generated for the add-on. In another embodiment, the record comprises two or more entries of status information on the add-on, including the generated recommendation identification.

At block 855, the retrieval software displays the Manage Add-On screen to the computer user.

In another embodiment, the logic flow of FIG. 8 illustrates a methodology for providing the user of a computer status on an add-on attempting to install on the computer. In this embodiment, when an add-on first attempts to install on a computer, at block 800, retrieval software communicates with collection software to query the collection software for information on the add-on. In this embodiment, at block 850, the record the retrieval software generates for the add-on in a Manage Add-On screen contains a recommendation identification regarding the add-on's attempt to install on the computer.

Computer System Configuration

Figure 9:
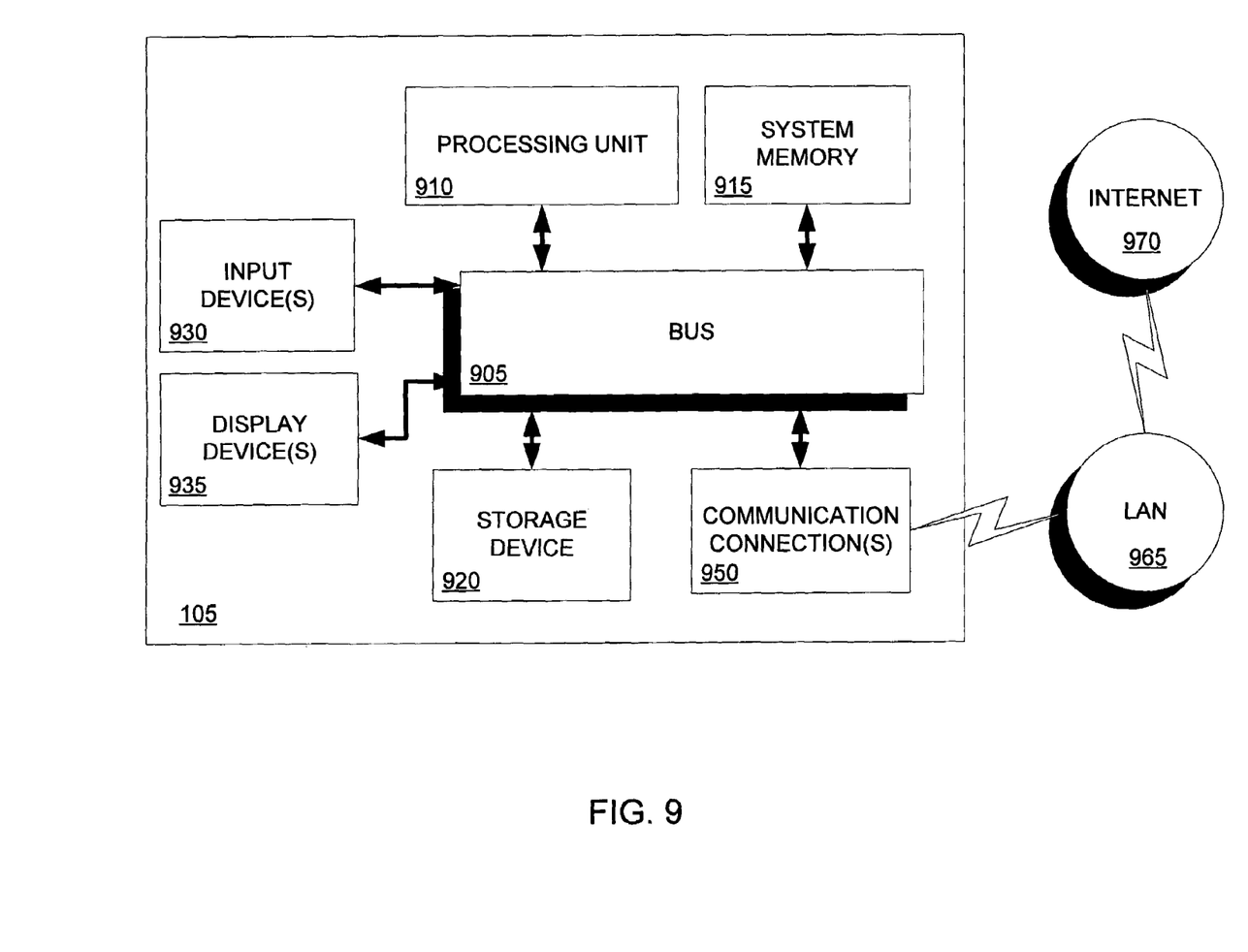
FIG. 9 is a block diagram of an exemplary basic computer system that can process computer software, i.e., program code, or instructions.

FIG. 9 is a block diagram that illustrates an exemplary computer system 105 upon which an embodiment may be implemented. The computer system 105 includes a bus 905 or other mechanism for communicating information, and a processing unit 910 coupled with the bus 905 for processing information. The computer system 105 also includes system memory 915, which may be volatile or dynamic, such as random access memory (RAM), non-volatile or static, such as read-only memory (ROM) or flash memory, or some combination of the two. The system memory 915 is coupled to the bus 905 for storing information and instructions to be executed by the processing unit 910, and may also be used for storing temporary variables or other intermediate information during the execution of instructions by the processing unit 910. The system memory 915 often contains an operating system and one or more programs, and may also include program data.

In an embodiment, a storage device 920, such as a magnetic or optical disk, is also coupled to the bus 905 for storing information, including program code comprising instructions and/or data.

The computer system 105 generally includes one or more display devices 935, such as, but not limited to, a display screen, e.g., a cathode ray tube (CRT) or liquid crystal display (LCD), a printer, and one or more speakers, for providing information to a computer user. The computer system 105 also generally includes one or more input devices 930, such as, but not limited to, a keyboard, mouse, trackball, pen, voice input device(s), and touch input devices, which a computer user can use to communicate information and command selections to the processing unit 910. All of these devices are known in the art and need not be discussed at length here.

The processing unit 910 executes one or more sequences of one or more program instructions contained in the system memory 915. These instructions may be read into the system memory 915 from another computer-readable medium, including, but not limited to, the storage device 920. In alternative embodiments, hard-wired circuitry may be used in place of or in combination with software program instructions. Thus, the computer system environment is not limited to any specific combination of hardware circuitry and software.

The term "computer-readable medium" as used herein refers to any medium that can participate in providing program instructions to the processing unit 910 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punchcards, papertape, or any other physical medium with patterns of holes, memory chip, or cartridge. The system memory 915 and storage device 920 of the computer system 105 are further examples of storage media. Examples of transmission media include, but are not limited to, wired media such as coaxial cable(s) and copper wire, and wireless media such as fiber optic signals, acoustic signals, RF signals and infrared signals.

The computer system 105 also includes one or more communication connections 950 coupled to the bus 905. The communication connection(s) 950 provide a two-way data communication coupling from the computer system 105 to other computer systems and/or computing devices on a local area network (LAN) 965 and/or wide area network (WAN), including the World Wide Web, or Internet 970. Examples of the communication connection(s) 950 include, but are not limited to, an integrated services digital network (ISDN) card, modem, LAN card, and any device capable of sending and receiving electrical, electromagnetic, optical, acoustic, RF or infrared signals.

Communications received by the computer system 105 can include program instructions and program data. The program instructions received by the computer system 105 may be executed by the processing unit 910 as they are received, and/or stored in the storage device 920 or other non-volatile storage for later execution.

CONCLUSION

While various embodiments are described herein, these embodiments have been presented by way of example only, and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for providing a user of a computer system that comprises retrieval software and collection software a recommendation identification for an add-on, the method comprising:

the retrieval software, residing in memory and executed by a processor disposed in the computer system, communicating with the collection software for information on an add-on;

the collection software, comprising one or more detection programs residing in the memory and executed by the processor disposed in the computer system, retrieving data on the add-on;

the collection software communicating information on the add-on to the retrieval software;

the retrieval software using the information communicated from the collection software to generate one or more recommendation identifications for the add-on;

the retrieval software one or more of:

ranking one or more recommendation identifications generated for the information on the add-on from the respective one or more detection programs based on a desired prioritization assigned to the respective detection programs; and determining a single recommendation identification for the add-on using a weighted scale based on a desired prioritization assigned to the respective detection programs; and the retrieval software causing the one or more recommendation identifications for the add-on to be displayed by the computer system.

2. The method of claim 1, further comprising the collection software accessing a local database for retrieving data on the add-on.

3. The method of claim 1, further comprising the collection software communicating with one or more computer servers for retrieving data on the add-on.

4. The method of claim 1, wherein the retrieval software is a browser and the collection software is one or more anti-spyware software programs.

5. The method of claim 1, further comprising:

the retrieval software generating one or more table entries for the add-on;

the retrieval software populating a record for the add-on with the one or more table entries; and the retrieval software executing instructions that result in a Manage Add-On screen comprising the record for the add-on to be displayed to the user of the computer system.

6. The method of claim 1, wherein the retrieval software communicates with the collection software for information on the add-on on the event of the add-on's attempt to instantiate on the computer system.

7. The method of claim 6, wherein the retrieval software generates a recommendation identification for the add-on that indicates that the add-on is safe to instantiate on the computer system, the add-on is hazardous to instantiate on the computer system, or the status of the add-on is unknown.

8. The method of claim 1, wherein the retrieval software and the collection software are both software of a browser running on the computer system.

9. The method of claim 1, wherein the information the collection software communicates to the retrieval software is the data the collection software retrieves on the add-on.

10. The method of claim 1, wherein the information the collection software communicates to the retrieval software is derived from the data the collection software retrieves on the add-on.

11. The method of claim 1, wherein the collection software is one or more anti-spyware software programs and the retrieval software is a browser, further comprising:

the browser generating a first recommendation identification for an add-on;

the browser causing the first recommendation identification for an add-on to be displayed to the user of the computer system in a Manage Add-On screen; and the browser causing an Add-On History screen to be displayed to the user of the computer system, wherein the Add-On History screen comprises a Re-Evaluate check box that allows a user of the computer system to command the browser to generate a second recommendation identification for the add-on.

12. A method for providing a user of a computer system that comprises a browser a recommendation identification for an add-on, the method comprising:

retrieving information on the add-on for the browser, executed by a processor disposed in the computer system, from one or more detection programs residing in memory of the computer system and executed by the processor disposed in the computer system;

using the retrieved information to generate status for the add-on, wherein the status comprises one or more recommendation identifications for the add-on;

one or more of:

ranking one or more recommendation identifications generated for the retrieved information on the add-on from the respective one or more detection programs based on a desired prioritization assigned to the respective detection programs; and determining a single recommendation identification for the add-on using a weighted scale based on a desired prioritization assigned to the respective detection programs; and using the browser residing on the computer system to display the one or more recommendation identifications for the add-on.

13. The method of claim 12, further comprising:

the browser communicating with one or more anti-spyware software programs to obtain information on the add-on;

the one or more anti-spyware software programs retrieving data on the add-on from a respective local database; and the one or more anti-spyware software programs using the retrieved data on the add-on to communicate information on the add-on to the browser.

14. The method of claim 12, further comprising:

the browser communicating with collection software to obtain information on the add-on, wherein the collection software comprises one or more anti-spyware software programs;

the collection software searching one or more computer servers to retrieve data on the add-on;

the collection software using data retrieved for the add-on to derive information on the add-on;

the collection software communicating the derived information on the add-on to the browser;

the browser using the derived information received from the collection software to generate a record for the add-on, wherein the record comprises an entry for the add-on's name, an entry for an identification of the add-on category, and an entry for the recommendation identification for the add-on; and the browser displaying the record for the add-on in a Manage Add-On screen to the user of the computer system.

15. The method of claim 12, wherein the status on the add-on further comprises the known name of the add-on, the publisher of the add-on, and an identification of the category of the add-on.

16. The method of claim 12, wherein the browser comprises software instructions for retrieving data on the add-on from a local database and software instructions for retrieving data on the add-on from one or more computer servers.

17. A computer-readable medium having computer-executable instructions stored thereon that, when the executable instructions are stored in memory and executed by a processor disposed in a computer system, implement a method for providing a user of the computer system a recommendation identification for an add-on, the computer-readable medium comprising:
  computer-executable instructions for communicating with collection software, comprising one or more detection programs to be executed by a processor disposed in the computer system, for information on the add-on;
  computer-executable instructions for using information received from the collection software on the add-on to generate the one or more recommendation identifications for the add-on:
  computer-executable instructions for one or more of:
    ranking one or more recommendation identifications generated for the retrieved information on the add-on from the respective one or more detection programs based on a desired prioritization assigned to the respective detection programs; and
    determining a single recommendation identification for the add-on using a weighted scale based on a desired prioritization assigned to the respective detection programs; and
  computer-executable instructions for displaying the one or more recommendation identifications on the computer system.

18. The computer-readable medium of claim 17, wherein the computer-executable instructions comprise a browser software program and the collection software is one or more anti-spyware software programs.

19. The computer-readable medium of claim 18, further comprising:
  computer-executable instructions for generating two or more record entries for the add-on, wherein one of the two or more record entries is the recommendation identification; and
  computer-executable instructions for outputting to a display unit of a computer system a Manage Add-On screen comprising the record of two or more record entries for the add-on.

20. The computer-readable medium of claim 18, wherein the one or more recommendation identifications lie within a range, wherein one end of the range indicates the add-on is safe to instantiate on the computer system and the other end of the range indicates the add-on is hazardous to instantiate on the computer system.

* * * * *